United States Patent
Iwamura (10) Patent No.: US 8,918,105 B2
(45) Date of Patent: Dec. 23, 2014

(54) MOBILE COMMUNICATION METHOD, MOBILE STATION, AND RADIO BASE STATION OPERABLE ON MULTIPLE CELLS

(75) Inventor: Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 145 days.

(21) Appl. No.: 13/520,973

(22) PCT Filed: Jan. 7, 2011

(86) PCT No.: PCT/JP2011/050160
§ 371 (c)(1),
(2), (4) Date: Sep. 12, 2012

(87) PCT Pub. No.: WO2011/083837
PCT Pub. Date: Jul. 14, 2011

(65) Prior Publication Data
US 2013/0005339 A1    Jan. 3, 2013

(30) Foreign Application Priority Data
Jan. 8, 2010  (JP) ................ P2010-003206

(51) Int. Cl.
*H04W 36/00* (2009.01)
*H04W 48/20* (2009.01)
*H04W 84/04* (2009.01)

(52) U.S. Cl.
CPC ............ *H04W 48/20* (2013.01); *H04W 84/045* (2013.01)
USPC .......................................................... 455/436

(58) Field of Classification Search
CPC ..... H04W 36/30; H04W 36/18; H04W 36/08; H04W 88/02; H04W 4/02; H04W 88/06
USPC .............................. 455/436, 422.1, 550.1, 561
See application file for complete search history.

(56) References Cited

U.S. PATENT DOCUMENTS
2013/0005339 A1*  1/2013  Iwamura ...................... 455/436

FOREIGN PATENT DOCUMENTS
WO   2009/157600 A1   12/2009

OTHER PUBLICATIONS

International Search Report w/translation from PCT/JP2011/050160 dated Mar. 8, 2011 (5 pages).
3GPP TS 36.300 V9.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Dec. 2009 (6 pages).

(Continued)

*Primary Examiner* — William D Cumming
(74) *Attorney, Agent, or Firm* — Osha Liang LLP (57) ABSTRACT

A mobile communication method involves the steps of a mobile station transmitting indication information to a radio base station managing the cell of entry of a predetermined area corresponding to a cell of a second frequency, a step of transmitting by the radio base station a measurement confirmation instructing the mobile station to start measuring a radio quality in the cell of the second frequency, a step of transmitting by the mobile station a measurement report including cell identification information used in a scrambling process for a synchronization signal broadcasted in the cell of the second frequency, a step of transmitting by the radio base station a report request to start transmitting predetermined information broadcasted in the cell of the second frequency when the radio base station has received the measurement report, and a step of reporting by the mobile station the predetermined information in response to the report request.

3 Claims, 3 Drawing Sheets

(56) References Cited

OTHER PUBLICATIONS

LG Electronics Inc., "CSG cell detection", 3GPP TSG-RAN2 Meeting #68; R2-097012, Nov. 9-14, 2009 (6 pages).
Motorola, NTT DOCOMO, Qualcomm Incorporated, Nokia Siemens Networks, Interdigital, "CR capturing HeNB inbound mobility agreements", 3GPP TSG-RAN WG2 Meeting #68bis, R2-100450, Jan. 18-22, 2010 (5 pages).
3GPP TS 36.331 V9.1.0; 3rd Generation Partnership Project; Technical Specification Group Radio Access Network; Evolved Universal Terrestrial Radio Access (E-UTRA) Radio Resource Control (RRC); Protocol specification (Release 9), Dec. 2009 (232 pages).
3GPP TS 36.304 V9.1.0; 3rd Generation Partnership Project; Technical Specification Group Radio Access Network; Evolved Universal Terrestrial Radio Access (E-UTRA); User Equipment (UE) procedures in idle mode (Release 9), Dec. 2009 (31 pages).
Office Action in counterpart Chinese Patent Application No. 201180005636.X, mailed Jun. 24, 2014 (10 pages).
3GPP TS 25.367 V9.2.0; "3rd Generation Partnership Project; Technical Specification Group Radio Access Network; Mobility Procedures for Home NodeB; Overall Description; Stage 2 (Release 9)"; Dec. 2009 (13 pages).

* cited by examiner

MOBILE COMMUNICATION METHOD, MOBILE STATION, AND RADIO BASE STATION OPERABLE ON MULTIPLE CELLS

TECHNICAL FIELD

The present invention relates to a mobile communication method, a mobile station, and a radio base station.

BACKGROUND ART

In an LTE (Long Term Evolution) mobile communication system, according to an Inbound handover procedure to a CSG (Closed Subscriber Group) cell, in order to solve problems caused by "PCI confusion" and perform a "preliminary access check", a mobile station UE is configured to receive broadcast information transmitted in the cell of a handover destination (Target Cell), and transmit "CGI (Cell Global Identity)" of the cell of a handover destination, "TAI (Tracking Area Identity)" of the cell of a handover destination, or "member/non-member indication", which indicates the belonging or non-belonging to "CSG-ID" broadcasted by the cell of a handover destination, to a radio base station S-eNB (Serving eNB) during communication.

Such an operation is called "SI (System Information) reporting". In addition, according to a normal handover procedure, the "SI reporting" is not performed.

It is possible for the radio base station S-eNB to uniquely designate a radio base station T-eNB (Target eNB), which manages the cell of a handover destination, by using the CGI and the TAI notified by the "SI reporting", and to transmit "HO Preparation signalling" to the radio base station T-eNB.

Furthermore, the radio base station S-eNB is configured to determine whether to perform a handover to the radio base station T-eNB of a mobile station UE or whether it is necessary to perform an "accessibility check" by a mobile switching center MME (Mobility Management Entity), based on the received "member/non-member indication".

Here, when a "measurement report" is received from the mobile station UE, based on "PCI (Physical Cell Identity)" included in the received "measurement report", the radio base station S-eNB is configured to determine whether there may occur "PCI confusion" in a cell with the PCI and whether it is necessary to perform a "preliminary access check".

For example, the radio base station S-eNB may be configured to set the range of PCI used for a CSG cell/a hybrid cell/an open (macro) cell at the time of starting a network operation, to determine the type of the CSG cell/the hybrid cell/the open cell based on the above-described PCI, and to determine that it is necessary to perform the "preliminary access check" when a cell designated by the above-described PCI is the CSG cell/the hybrid cell.

Furthermore, when the cell designated by the above-described PCI is the CSG cell/the hybrid cell, the radio base station S-eNB may determine that there probably occurs the "PCI confusion".

Furthermore, the radio base station S-eNB may classify the range of the PCI used for the open cell into the range of PCI used for a cell (for example, an open femto cell) where there may occur the "PCI confusion" and the range of PCI used for a cell (for example, a normal macro cell) where there is no probability of the "PCI confusion", and may determine that it is necessary to solve problems caused by the "PCI confusion" when the PCI belonging to the former range is reported.

When it is determined that it is necessary to solve problems caused by the "preliminary access check" or the "PCI confusion", it is possible for the radio base station S-eNB to transmit an "SI reporting request" for requesting the "SI reporting", to the mobile station UE.

Here, the "SI reporting request" designates the PCI of a cell subject to "SI reporting", to the mobile station UE.

When the "SI reporting request" is received, the mobile station UE is configured to receive SI, which has been broadcasted in a cell with the PCI designated by the "SI reporting request", based on an "autonomous gap", and to transmit CGI, TAI, or "member/non-member indication" included in the received SI, to the radio base station S-eNB.

That is, the mobile station UE is configured to temporarily interrupt the transmission/reception of a signal with a cell (a serving cell) during communication at a reception timing of SI (MIB and SIB1 in the case of an LTE scheme) broadcasted in the cell, and to receive the SI broadcasted in the cell.

Then, when succeeding the reception of the SI in a predetermined period (scheduled to be about 150 ms in the LTE scheme), the mobile station UE is configured to report necessary information to the radio base station S-eNB.

In addition, even when failing the reception of the SI in the predetermined period, the mobile station UE is configured to report the failure to the radio base station S-eNB.

Here, when the "SI reporting" is requested to a CSG cell that is not granted to access, the mobile station UE encounters, at each time, interruption of transmission/reception of a signal with a cell that is in communication, and signal transmission for the "SI reporting" or a C-plane process.

Therefore, when a large number of CSG cells that are not granted to access exist around the mobile station UE, the wasted "SI reporting" may frequently occur.

In order to solve such a problem, the mobile station UE is configured to transmit "proximity indication" based on an "autonomous search".

That is, the mobile station UE holds fingerprint information of a CSG cell that is granted to access and upon detection that the mobile station UE approaches the CSG cell based on the fingerprint information, the mobile station UE is configured to transmit "entering proximity indication" to the radio base station S-eNB, and upon detection that the mobile station UE has been away from the CSG cell, the mobile station UE is configured to transmit "leaving proximity indication" to the radio base station S-eNB.

Here, the fingerprint information indicates surrounding environments of the CSG cell, and for example, may include a cell ID of a neighboring macro cell, RSRP (Reference Signal Received Power) of a neighboring cell, GPS information, and the like.

When the "entering proximity indication" is reported from the mobile station UE, it is possible for the radio base station S-eNB to transmit, as needed, the "SI reporting request" to PCI reported by a subsequent "measurement report".

Consequently, the "SI reporting" is implemented only in an area designated by the fingerprint information, so that it is possible to avoid the implementation of waste "SI reporting".

In addition, the "proximity indication" is used for the control of a "measurement configuration" for a cell having a different frequency or a different RAT (Radio Access Technology) cell, as well as the control of the "SI reporting".

That is, if the "measurement configuration" for the cell having a frequency or RAT different from that of a cell that is in communication has not been set, it is not possible for the mobile station UE to perform "measurement" for the cell having a different frequency or the different RAT (Radio Access Technology) cell.

When the CSG cell that is granted to access exists with a frequency or RAT different from that of a cell that is in communication, around the cell that is in communication, the mobile station UE transmits the "entering proximity indication" to the radio base station S-eNB so as to enable requesting the setting of a necessary "measurement configuration", and transmits the "leaving proximity indication" so as to enable requesting the deletion of an unnecessary "measurement configuration".

The "measurement configuration" may include a "measurement object" indicating the cell having a frequency or RAT different from that of the cell that is in communication, a "reporting configuration", "measurement identity", a "measurement gap", and the like.

To this end, it is possible for the mobile station UE to notify information on a frequency or RAT for requesting the "measurement configuration" through the "proximity indication".

However, in current control in the above-described mobile communication system, when a number of CSG cells for which the mobile station UE has no access permission exist in an area designated by the fingerprint information, there is a problem that the "SI reporting" may frequently occur.

Furthermore, the setting of the fingerprint information depends on each case, and therefore, high accurate fingerprint information such as GPS information is not always set in the mobile station UE, and for example, the fingerprint information may be set in units of TAs or PLMNs (Public Land Mobile Networks).

In such a case, in the current control, there is a problem that the frequent occurrence of the "SI reporting" may not be sufficiently suppressed. SUMMARY OF THE INVENTION Therefore, the present invention has been achieved in view of the above-described problems, and an object thereof is to provide a mobile communication method, a mobile station, and a radio base station, by which it is possible to suppress the frequent occurrence of waste "SI reporting".

A first characteristic of the present embodiment is summarized in that a mobile communication method comprising, a step of transmitting, by a mobile station that is in communication in a cell of a first frequency, indication information including cell identification information used in a scrambling process for a synchronization signal broadcasted in a cell of a second frequency to a radio base station managing the cell of the first frequency, upon detection of entry of a predetermined area corresponding to the cell of the second frequency for which the mobile station has access permission or upon detection of exit from the predetermined area, a step of transmitting, by the mobile station, a measurement report including the cell identification information to the radio base station, and a step of reporting, by the mobile station, predetermined information broadcasted in the cell of the second frequency in response to a report request received from the radio base station.

A second characteristic of the present embodiment is summarized in that a mobile station, comprising, an indication information transmission unit configured to transmit indication information including cell identification information used in a scrambling process for a synchronization signal broadcasted in a cell of a second frequency to a radio base station managing a cell of a first frequency, upon detection of entry of a predetermined area corresponding to the cell of the second frequency for which the mobile station has access permission or upon detection of exit from the predetermined area, during communication in the cell of the first frequency, a measurement report transmission unit configured to transmit a measurement report including the cell identification information to the radio base station, and a broadcast information report transmission unit configured to report predetermined information broadcasted in the cell of the second frequency in response to a report request received from the radio base station.

A third characteristic of the present embodiment is summarized in that a radio base station managing a cell of a first frequency, comprising, an indication information reception unit configured to receive indication information including cell identification information used in a scrambling process for a synchronization signal broadcasted in a cell of a second frequency from a mobile station that is in communication in the cell of the first frequency detected to enter a predetermined area corresponding to the cell of the second frequency for which the mobile station has access permission or the mobile station detected to exit from the predetermined area, a measurement report reception unit configured to receive a measurement report including the cell identification information from the mobile station; and a report request transmission unit configured to transmit a report request for requesting a report of predetermined information broadcasted in the cell of the second frequency to the mobile station.

As described above, according to the present invention, it is possible to provide a mobile communication method, a mobile station, and a radio base station, by which it is possible to suppress the frequent occurrence of waste "SI reporting".

DESCRIPTION OF EMBODIMENTS

Configuration of Mobile Communication System According to First Embodiment of the Present Invention With reference to FIG. 1 to FIG. 3, the configuration of a mobile communication system according to a first embodiment of the present invention will be described.

Figure 1:
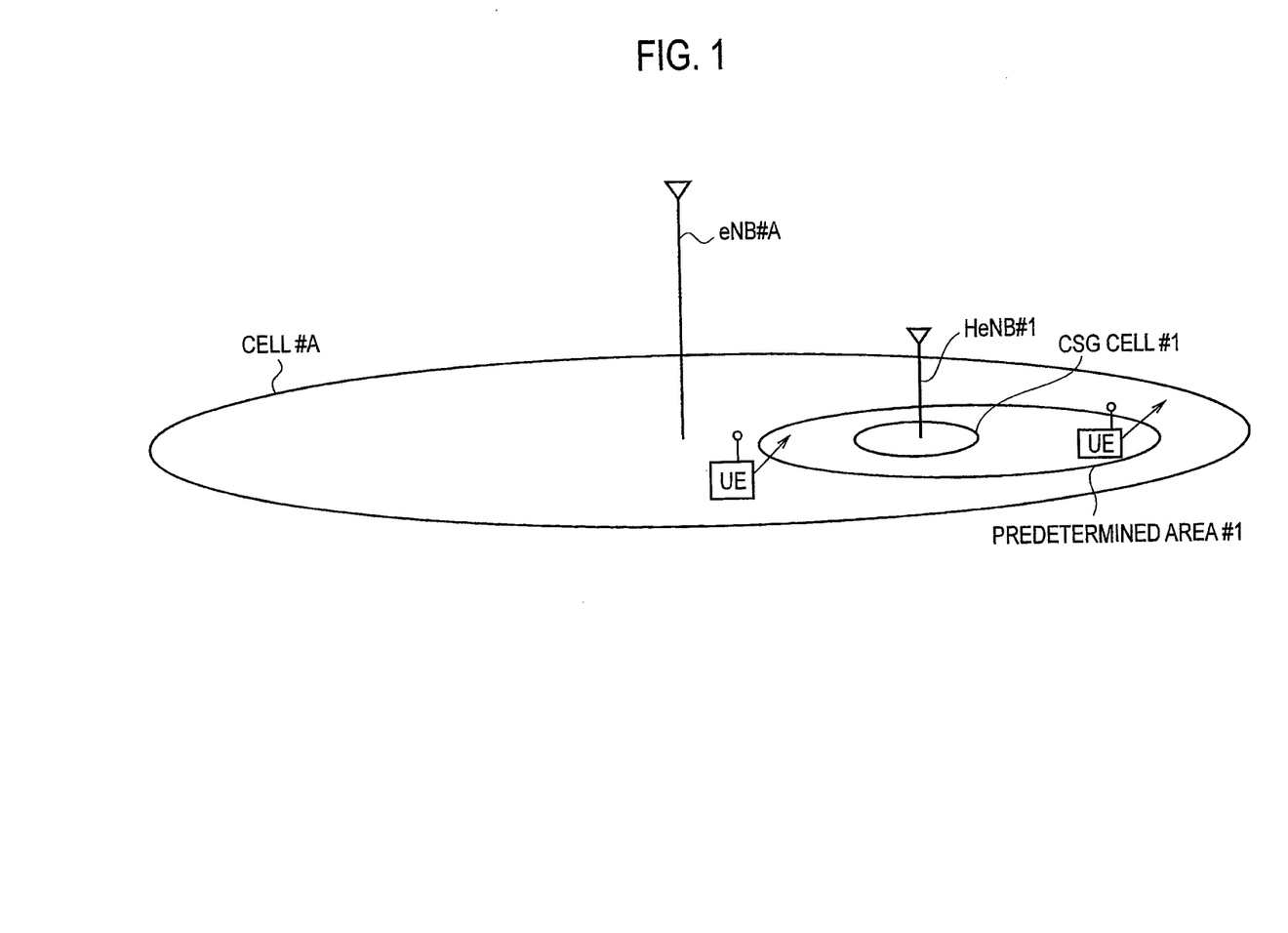
FIG. 1 is a diagram showing the entire configuration of a mobile communication system according to a first embodiment of the present invention.

The mobile communication system according to the present embodiment is a mobile communication system of the LTE scheme, and in the mobile communication system, as illustrated in FIG. 1, a cell #A of a frequency f1 managed by a radio base station eNB#A and a CSG cell #1 of a frequency f2 managed by a radio base station HeNB#1 are located. Here, the CSG cell #1 is located within the area of the cell #A.

Figure 2:
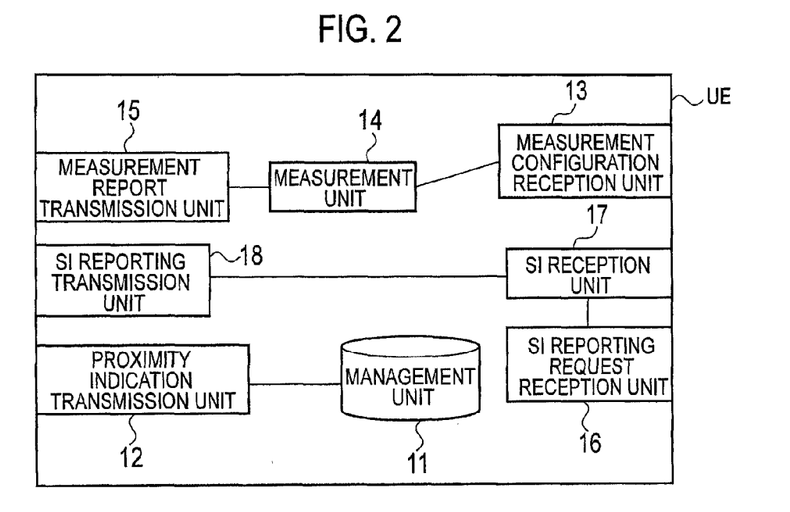
FIG. 2 is a functional block diagram of a mobile station according to the first embodiment of the present invention.

As illustrated in FIG. 2, a mobile station UE includes a management unit 11, a proximity indication transmission unit 12, a measurement configuration reception unit 13, a measurement unit 14, a measurement report transmission unit 15, an SI reporting request reception unit 16, an SI reception unit 17, and an SI reporting transmission unit 18.

The management unit 11 is configured to manage a predetermined area corresponding to the frequency of a CSG cell for which the mobile station UE has the access permission.

For example, in the present embodiment, the management unit 11 is configured to manage a predetermined area #1 corresponding to a frequency f2 of the CSG cell #1 for which the mobile station UE has the access permission.

Here, the predetermined area #1 may be a larger area than the above-described CSG cell #1 or may be equal to the above-described CSG cell #1 in size.

The predetermined area #1 is an area defined by fingerprint information, and is information in which the mobile station UE stores "surrounding environments" including the above-described CSG cell #1.

For example, the predetermined area #1 may correspond to information based on the ID of a neighboring macro cell, a signal reception level from the macro cell, GPS information, and the like, or a location registration area ID, a PLMN ID, and the like, and the type of information to be used may depend on each case.

The proximity indication transmission unit 12 is configured to transmit "entering proximity indication (first indication information)" or "leaving proximity indication (second indication information)" to the radio base station eNB#A with which the mobile station UE is communicating.

For example, when it is detected that the mobile station UE has entered the predetermined area #1 that is in communication in the cell #A, the proximity indication transmission unit 12 is configured to transmit the "entering proximity indication" including PCI of the CSG cell #1 to the radio base station eNB#A.

Here, the PCI is used for a scrambling process for a Primary-SCH (Synchronization Channel) signal and a Secondary-SCH signal (a synchronization signal) broadcasted in the CSG cell #1.

In addition, the PCI is classified into PCI in a range used for a CSG cell, PCI in a range used for a hybrid cell, and PCI in a range used for an open cell.

Furthermore, the PCI in a range used for an open cell may be further classified into PCI in a range used for a cell (for example, an open femto cell) where there may occur "PCI confusion", and PCI in a range used for a cell (for example, a normal macro cell) where there is no probability of the "PCI confusion".

Furthermore, when it is detected that the mobile station UE exits from the predetermined area #1 that is in communication in the cell #A, the proximity indication transmission unit 12 is configured to transmit the "leaving proximity indication" including the PCI of the CSG cell #1.

In addition, the above-described "entering proximity indication" and the "leaving proximity indication" may include the RAT, frequency, CGI, and the like of the CSG cell #1, in addition to the PCI of the CSG cell #1.

The measurement configuration reception unit 13 is configured to receive a "measurement configuration" including a "measurement gap" from the radio base station eNB#A with which the mobile station UE is communicating.

When the CSG cell #1 is detected through a cell search with the frequency f2 at the "measurement gap" received in the measurement configuration reception unit 13, the measurement unit 14 is configured to measure the radio quality of the CSG cell #1.

In addition, when the "measurement configuration" indicating the stop of measurement of the radio quality in the CSG cell #1 with the frequency f2 at the "measurement gap" is received from the radio base station eNB#A with which the mobile station UE is communicating, the measurement unit 14 is configured to stop the cell search and the measurement of the radio quality.

The measurement report transmission unit 15 is configured to transmit a "measurement report" including the PCI of the CSG cell #1 in order to report a measurement result (a measurement result of the radio quality in the CSG cell #1) by the measurement unit 14 to the radio base station eNB#A with which the mobile station UE is communicating.

The SI reporting request reception unit 16 is configured to receive an "SI reporting request" from the radio base station eNB#A with which the mobile station UE is communicating.

Based on an "autonomous gap", the SI reception unit 17 is configured to receive SI broadcasted in a cell with PCI designated by the "SI reporting request" received in the SI reporting request reception unit 16.

The SI reporting transmission unit 18 is configured to transmit "SI reporting" including predetermined information, such as CGI, TAI, "member/non-member indication" included in the SI received in the SI reception unit 17, to the radio base station eNB#A with which the mobile station UE is communicating.

Figure 3:
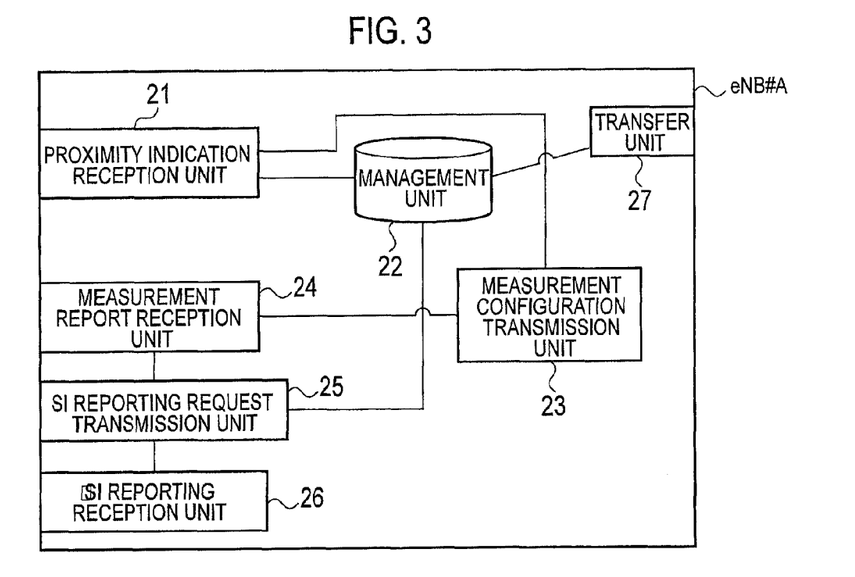
FIG. 3 is a functional block diagram of a radio base station according to the first embodiment of the present invention.

As illustrated in FIG. 3, the radio base station eNB#A includes a proximity indication reception unit 21, a management unit 22, a measurement configuration transmission unit 23, a measurement report reception unit 24, an SI reporting request transmission unit 25, an SI reporting reception unit 26, and a transfer unit 27.

The proximity indication reception unit 21 is configured to receive the "entering proximity indication" or the "leaving proximity indication" transmitted from the mobile station UE communicating with the radio base station eNB#A.

The management unit 22 is configured to manage the "entering proximity indication" or the "leaving proximity indication" received in the proximity indication reception unit 21.

For example, the management unit 22 is configured to associate the identification information of the mobile station UE and the PCI of the CSG cell #1 with the "entering proximity indication" or the "leaving proximity indication" for management.

The measurement configuration transmission unit 23 is configured to transmit a "measurement configuration", which indicates the start or stop of measurement of the radio quality in a specific cell at the "measurement gap", to the mobile station UE communicating with the radio base station eNB#A.

Here, the measurement configuration transmission unit 23 may be configured to transmit the "measurement configuration", which indicates the start of the measurement of the radio quality in a cell of a frequency included in the "entering proximity indication" or the "leaving proximity indication" received in the proximity indication reception unit 21.

The measurement report reception unit 24 is configured to receive the "measurement report" transmitted from the mobile station UE communicating with the radio base station eNB#A.

The SI reporting request transmission unit 25 is configured to transmit an "SI reporting request" to the mobile station UE communicating with the radio base station eNB#A.

For example, the SI reporting request transmission unit 25 may be configured to determine whether to transmit the "SI reporting request" to the mobile station UE based on the "entering proximity indication" or the "leaving proximity indication" received in the proximity indication reception unit 21, and the "measurement report" received in the measurement report reception unit 24.

Specifically, when a "measurement report" including radio quality at the PCI associated with the "entering proximity indication" managed by the management unit 22 is received in the measurement report reception unit 24, the SI reporting request transmission unit 25 may determine to transmit the "SI reporting request" indicating the start of the transmission of the "SI reporting" to a mobile station UE designated by the identification information of the mobile station UE associated with the "entering proximity indication".

Meanwhile, when the PCI of the CSG cell having radio quality reported by the "measurement report" transmitted from the mobile station UE is not managed to be associated, by the management unit 22, with the "entering proximity indication", the SI reporting request transmission unit 25 may regard that the mobile station UE has no access permission for the CSG cell and may determine not to transmit the "SI reporting request" indicating the start of the transmission of the "SI reporting" to the mobile station UE.

Furthermore, when the PCI of the CSG cell having the radio quality reported by the "measurement report" transmitted from the mobile station UE is the PCI in the range used for the hybrid cell, the SI reporting request transmission unit 25 may determine to uniformly transmit the "SI reporting request" to the mobile station UE.

Furthermore, when the "leaving proximity indication" is received from the mobile station UE, the SI reporting request transmission unit 25 may determine to transmit the "SI reporting request" indicating the stop of the transmission of the "SI reporting" to the mobile station UE, and the measurement configuration transmission unit 23 may determine to transmit the "measurement configuration" indicating the stop of the measurement of the radio quality in the CSG cell #1 at the "measurement gap" to the mobile station UE.

The SI reporting reception unit 26 is configured to receive the "SI reporting" from the mobile station UE communicating with the radio base station eNB#A.

When it is determined to perform a handover from the cell #A of the mobile station UE to a cell subordinate to another radio base station eNB, the transfer unit 27 is configured to transfer the "entering proximity indication" or the "leaving proximity indication" managed by the management unit 22 to the another radio base station eNB.

Specifically, the transfer unit 27 may be configured to transfer the PCI, CGI, RAT, frequency, and the like of the CSG cell #1, reported by the "entering proximity indication" received from the mobile station UE and not reported by the "leaving proximity indication" received from the mobile station UE.

Here, the transfer unit 27 may also be configured to transfer the identification information of the mobile station UE, together with the PCI of the CSG cell #1 associated with the "entering proximity indication" or the "leaving proximity indication".

For example, the transfer unit 27 may be configured to transfer these information through "HO Preparation signalling".

Furthermore, the transfer unit 27 may be configured to transfer a "configuration state" indicating whether to permit the transmission of the "proximity indication" to the mobile station UE.

Here, the transmission or non-transmission of the "proximity indication" can be set in each RAT, and therefore, the transfer unit 27 may be configured to transfer a "configuration state" indicating which RAT is permitted to transmit the "proximity indication".

Operation of the Mobile Communication System According to the First Embodiment of the Present Invention With reference to FIG. 4, the operation of the mobile communication system according to the first embodiment of the present invention will be described.

Here, it is assumed that the radio base station eNB#A permits the mobile station UE during communication to transmit the "entering proximity indication" and the "leaving proximity indication" through individual signaling.

Figure 4:
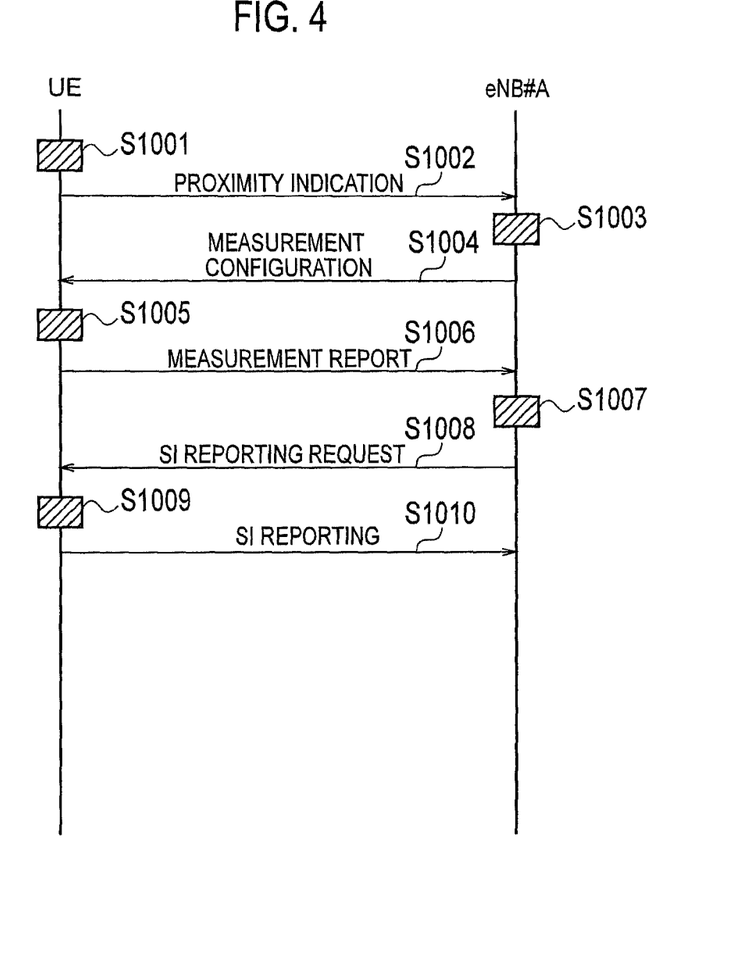
FIG. 4 is a sequence diagram illustrating an operation of the mobile communication system according to the first embodiment of the present invention.

As illustrated in FIG. 4, when it is detected that the mobile station UE has entered the predetermined area #1 in step S1001, the mobile station UE transmits the "entering proximity indication" to the radio base station eNB#A in step S1002.

The radio base station eNB#A stores the received "entering proximity indication" in the management unit 22 in step S1003, and transmits a "measurement configuration", which indicates the start of the measurement of the radio quality in the CSG cell #1 included in the "entering proximity indication", to the mobile station UE in step S1004.

The mobile station UE performs measurement of the radio quality in the CSG cell #1 based on the "measurement configuration" in step S1005, and transmits a "measurement report", which includes the PCI of the CSG cell #1 and a measurement result of the radio quality in the CSG cell #1, to the radio base station eNB#A in step S1006.

The radio base station eNB#A confirms that the PCI of the CSG cell #1 included in the received "measurement report", the identification information of the mobile station UE, and the "entering proximity indication" have been associated with one another and managed by the management unit 22 in step S1007, and transmits an "SI reporting request" indicating the start of the transmission of "SI reporting" to the mobile station UE in step S1008.

The mobile station UE receives predetermined information broadcasted in the CSG cell #1 indicated by the "SI reporting request" in step S1009, and transmits "SI reporting" including the predetermined information to the radio base station eNB#A in step S1010.

Operation and Effect of the Mobile Communication System According to the First Embodiment of the Present Invention In accordance with the mobile communication system according to the first embodiment of the present invention, the mobile station UE is configured to transmit the "entering proximity indication" and the "leaving proximity indication", which includes the PCI of the CSG cell #1 that is granted to access, to the radio base station eNB#1, so that it is possible to avoid the transmission of the "SI reporting request" for requesting the transmission of the "SI reporting" for the CSG cell for which the mobile station UE having no access permission.

The characteristics of the present embodiment as described above may be expressed as follows.

A first characteristic of the present embodiment is summarized in that a mobile communication method includes: a step of transmitting, by a mobile station UE that is in communication in a cell #A of a first frequency f1, "proximity indication (indication information)" including PCI (cell identification information) used in a scrambling process for a Primary-SCH signal and a Secondary-SCH signal (a synchronization signal) broadcasted in a CSG cell #1 to a radio base station eNB#A managing the cell #A, upon detection of entry of a predetermined area #1 corresponding to the CSG cell #1 of a second frequency f2 for which the mobile station UE has access permission or upon detection of exiting from the predetermined area #1; a step of transmitting, by the mobile station UE, a "measurement report" including the PCI of the CSG cell #1 to the radio base station eNB#A; and a step of transmitting, by the mobile station UE, "SI reporting" including predetermined information (for example, CGI, TAI, and "member/non-member indication") broadcasted in the CSG cell #1 in response to an "SI reporting request (a report request)" received from the radio base station eNB#A.

In the first characteristic of the present embodiment, it is possible to include a step of determining, by the radio base station eNB#A, whether to transmit the "SI reporting request" to the mobile station UE based on the received "proximity indication" and "measurement report".

In the first characteristic of the present embodiment, it is possible to include a step of transferring, by the radio base station eNB#A, the "proximity indication" to another radio base station eNB when it is determined to perform a handover from the cell #A of the first frequency f1 of the mobile station UE to a cell subordinate to the another radio base station eNB.

A second characteristic of the present embodiment is summarized in that a mobile station UE includes: a proximity indication transmission unit 12 configured to transmit "proximity indication" including the PCI of a CSG cell #1 to a radio base station eNB#A managing a cell #A, upon detection of entry of a predetermined area #1 or upon detection of exiting from the predetermined area #1, during communication in the cell #A; a measurement report transmission unit 15 configured to transmit a "measurement report" including the PCI of the CSG cell #1 to the radio base station eNB#A; and an SI reporting transmission unit 18 configured to transmit "SI reporting" including predetermined information (for example, CGI, TAI, and "member/non-member indication") broadcasted in a CSG cell in response to an "SI reporting request" received from the radio base station eNB#A.

A third characteristic of the present embodiment is summarized in that a radio base station eNB#A managing a cell #A includes: a proximity indication reception unit 21 configured to receive "proximity indication" including the PCI of a CSG cell #1 from a mobile station UE that is in communication in the cell #A having been detected to enter predetermined area #1 or exiting from the predetermined area #1; a measurement report reception unit 24 configured to receive a "measurement report" including the PCI of the CSG cell #1 from the mobile station UE; and an SI reporting request transmission unit 25 configured to transmit an "SI reporting request" for requesting the transmission of "SI reporting" including predetermined information (for example, CGI, TAI, and "member/non-member indication") broadcasted in a CSG cell #1 to the mobile station UE.

In the third characteristic of the present embodiment, the SI reporting request transmission unit 25 may be configured to determine whether to transmit the "SI reporting request" to the mobile station UE based on the received "proximity indication" and the "measurement report".

In the third characteristic of the present embodiment, the radio base station eNB#A may include a transfer unit 27 configured to transfer the "proximity indication" to another radio base station eNB when it is determined to perform a handover from the cell #A of the mobile station UE to a cell subordinate to the another radio base station eNB.

It is noted that the operation of the above-described the mobile station Ue and the radio base station eNB#A/HeNB#1 may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station Ue and the radio base station eNB#A/HeNB#1. Further, such a storage medium or a processor may be arranged, as a discrete component, in the mobile station Ue and the radio base station eNB#A/HeNB#1.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method, a mobile station, and a radio base station, by which it is possible to suppress the frequent occurrence of waste "SI reporting".

REFERENCE SIGNS LIST

UE . . . mobile station
11 . . . management unit
12 . . . proximity indication transmission unit
13 . . . measurement configuration reception unit
14 . . . measurement unit
15 . . . measurement report transmission unit
16 . . . SI reporting request reception unit
17 . . . SI reception unit
18 . . . SI reporting transmission unit
eNB#A . . . radio base station
21 . . . proximity indication reception unit
22 . . . management unit
23 . . . measurement configuration transmission unit
24 . . . measurement report reception unit
25 . . . SI reporting request transmission unit
26 . . . SI reporting reception unit
27 . . . transfer unit

The invention claimed is:
1. A mobile communication method comprising:
a step of transmitting, by a mobile station that is in communication in a cell of a first frequency, indication information to a radio base station managing the cell of the first frequency, upon detection of entry of a predetermined area corresponding to a cell of a second frequency for which the mobile station has access permission or upon detection of exit from the predetermined area;
a step of transmitting, by the radio base station to the mobile station, a measurement configuration instructing the mobile station to start measuring a radio quality in the cell of the second frequency when the radio base station has received the indication information;
a step of transmitting, by the mobile station to the radio base station in response to the measurement configuration, a measurement report including cell identification information used in a scrambling process for a synchronization signal broadcasted in the cell of the second frequency;

a step of transmitting, by the radio base station to the mobile station, a report request instructing to start transmitting predetermined information broadcasted in the cell of the second frequency when the radio base station has received the measurement report; and a step of reporting, by the mobile station, the predetermined information in response to the report request received from the radio base station.

2. A mobile station, comprising:

an indication information transmission unit configured to transmit indication information to a radio base station managing a cell of a first frequency when the mobile station is detected to enter a predetermined area corresponding to a cell of a second frequency for which the mobile station has access permission, or when the mobile station is detected to exit from the predetermined area while the mobile station is in communication in the cell of the first frequency;

a measurement configuration reception unit configured to receive, from the radio base station, a measurement configuration instructing the mobile station to start measuring a radio quality in the cell of the second frequency;

a measurement report transmission unit configured to transmit, to the radio base station in response to the measurement configuration, a measurement report including cell identification information used in a scrambling process for a synchronization signal broadcasted in the cell of the second frequency;

a report request reception unit configured to receive, from the radio base station, a report request instructing the mobile station to start transmitting predetermined information broadcasted in the cell of the second frequency; and a broadcast information report transmission unit configured to report the predetermined information in response to the report request received from the radio base station.

3. A radio base station managing a cell of a first frequency, comprising:

an indication information reception unit configured to receive indication information from a mobile station that is in communication in the cell of the first frequency detected to enter a predetermined area corresponding to a cell of a second frequency for which the mobile station has access permission or the mobile station detected to exit from the predetermined area;

a measurement configuration transmission unit configured to transmit, to the mobile station, a measurement configuration instructing to start measuring a radio quality in the cell of the second frequency;

a measurement report reception unit configured to receive, from the mobile station, a measurement report including cell identification information used in a scrambling process for a synchronization signal broadcasted in the cell of the second frequency;

a report request transmission unit configured to transmit, to the mobile station, a report request for requesting a report of predetermined information broadcasted in the cell of the second frequency; and a broadcast information report reception unit configured to receive the predetermined information.

\* \* \* \* \*